(No Model.)

O. PELKEY.
SLED BRAKE.

No. 280,508. Patented July 3, 1883.

WITNESSES:
Chas. T. Howell
C. Sedgwick

INVENTOR:
O. Pelkey
BY Munn & Co.
ATTORNEYS.

UNITED STATES PATENT OFFICE.

OLIVER PELKEY, OF ARNOT, PENNSYLVANIA.

SLED-BRAKE.

SPECIFICATION forming part of Letters Patent No. 280,503, dated July 3, 1883.

Application filed April 9, 1883. (No model.)

*To all whom it may concern:*

Be it known that I, OLIVER PELKEY, of Arnot, in the county of Tioga and State of Pennsylvania, have invented a new and Improved Sled-Brake, of which the following is a full, clear, and exact description.

The invention consists of an arrangement whereby the tongue-roller is made to actuate the brake when the sled overruns the roller, the pivots of the tongue-roller being arranged in slots of the runners for allowing them to shift ahead when the brake needs to be applied; and the invention also consists of a contrivance whereby the brake of the hindmost sled of a pair of bob-sleds is also put in action by the same means, as hereinafter fully described.

Reference is to be had to the accompanying drawings, forming part of this specification, in which similar letters of reference indicate corresponding parts in both the figures.

Figure 1:
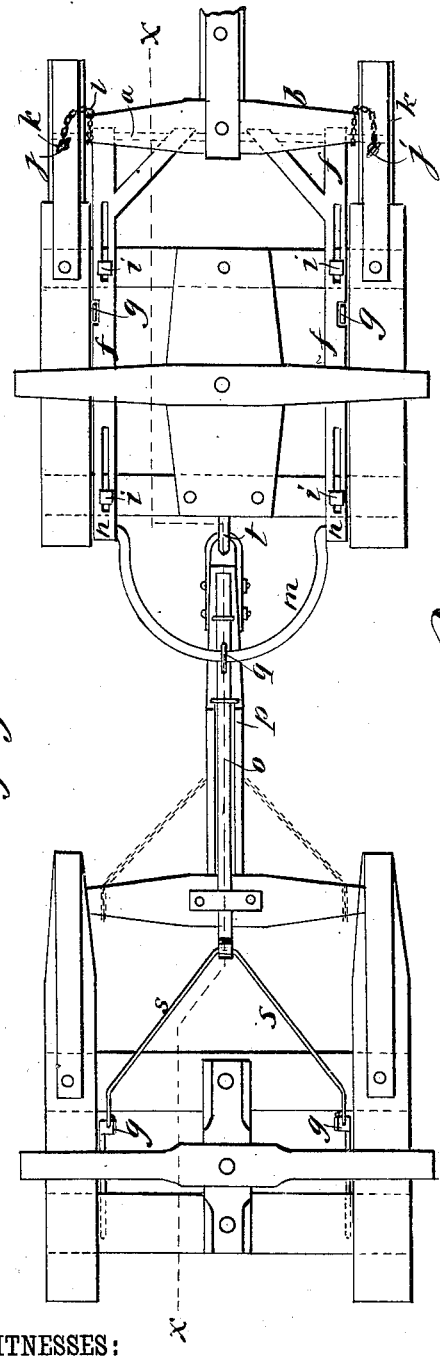
Figure 2:
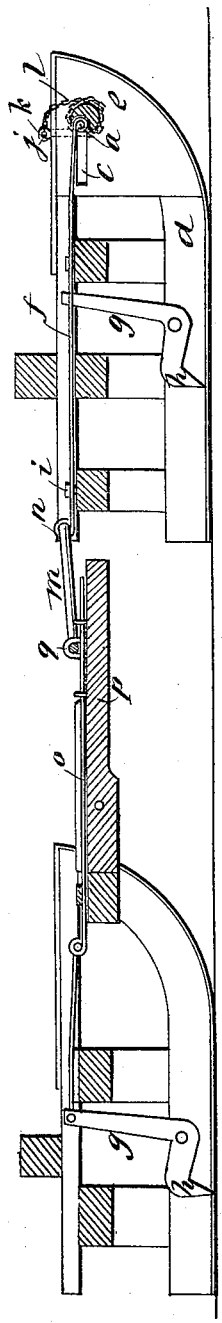

Figure 1 is a plan view of a pair of bob-sleds with brakes of my improved contrivance, and Fig. 2 is a longitudinal section of Fig. 1 on line *x x*.

The pivots *a* of the tongue-roller *b* are arranged in horizontal slots *c* in the runners *d*, and re-enforcing plates *e* attached thereto, so that when the sled slides ahead by its own gravity it may overrun said pivots, and thereby the tongue will thrust back the bars *f*, attached to it and connected with the brake-arms *g*, so as to thrust down the brake-points *h*, the bars *f* being fitted on guides *i*, suitably for sliding along the sled. When it is desired to prevent the action of the brake and allow the sled to be backed, pins *j* are inserted in holes *k*, to prevent the back movement of the tongue, or, rather, the forward movement of the sled. The pins will be connected to the sled by chains *l* for safe-keeping.

To connect the brakes of the hindmost sled, so as to be actuated by the same means, the bars *f* are extended back to the rear end of the forward sled, and have a yoke, *m*, fastened to them at *n*, with which a bar, *o*, fitted to slide on the tongue *p*, is connected by a staple, *q*, and which connects with the brake-levers *g* of the hind sled by the rod *s*, whereby the brakes of both sleds are actuated by the same action of the tongue and at the same time. The pivot-joints *n* of the yoke *m* are coincident transversely with the joint *t*, by which the tongue *p* of the hind sled is connected to the forward sled, allowing the requisite vertical vibration without hinderance of the proper action of the brake-connecting devices, and the yoke *m* is formed on the radius of the joint *t*, to allow the lateral vibrations to take place without interference with the brake apparatus.

Having thus described my invention, I claim as new and desire to secure by Letters Patent—

The sliding bars *f*, connecting the brake-levers *g* of the front sled with the tongue-roller, arranged in slots *c*, and extended to the rear end of said sled, and jointed coincidently with joint *t* to the yoke *m*, with which the brake-levers of the hindmost sled are connected, substantially as described.

OLIVER PELKEY.

Witnesses:
  H. W. ROLAND,
  PETER F. BATA.